(12) United States Patent
Nakahara et al.

(10) Patent No.: US 8,691,302 B2
(45) Date of Patent: Apr. 8, 2014

(54) PEPTIDE-CONTAINING SEASONING

(75) Inventors: Takeharu Nakahara, Noda (JP); Riichiro Uchida, Noda (JP); Yoichi Hanada, Noda (JP); Yoshikazu Endo, Noda (JP); Shigeki Tanizawa, Noda (JP); Hitomi Aota, Noda (JP); Seiichi Hara, Noda (JP)

(73) Assignee: Kikkoman Corporation, Chiba (JP)

( * ) Notice: Subject to any disclaimer, the term of this patent is extended or adjusted under 35 U.S.C. 154(b) by 85 days.

(21) Appl. No.: 13/001,931

(22) PCT Filed: Jul. 2, 2009

(86) PCT No.: PCT/JP2009/062154
§ 371 (c)(1),
(2), (4) Date: Dec. 29, 2010

(87) PCT Pub. No.: WO2010/001977
PCT Pub. Date: Jan. 7, 2010

(65) Prior Publication Data
US 2011/0104334 A1 May 5, 2011

(30) Foreign Application Priority Data

Jul. 2, 2008 (JP) .............................. P2008-172871
Jun. 29, 2009 (JP) .............................. P2009-153239

(51) Int. Cl.
*A23L 1/238* (2006.01)

(52) U.S. Cl.
USPC .......................................... 426/52; 426/650

(58) Field of Classification Search
USPC .................................................. 426/52, 650
See application file for complete search history.

(56) References Cited

U.S. PATENT DOCUMENTS

| 3,912,822 | A | 10/1975 | Yokotsuka et al. |
| 4,684,527 | A | 8/1987 | Motai et al. |
| 6,127,161 | A | 10/2000 | Umitsuki et al. |

FOREIGN PATENT DOCUMENTS

| DE | 19526485 | 1/1997 |
| EP | 0823997 | 2/1998 |
| EP | 1279341 | 1/2003 |
| JP | 59-055165 | 3/1984 |
| JP | 60-037946 | 2/1985 |
| JP | 5-316991 | 12/1993 |
| JP | 06062793 | 3/1994 |
| JP | 8173093 | 7/1996 |
| JP | 08252075 | 10/1996 |
| JP | 11075765 | 3/1999 |
| JP | 11118160 | 4/1999 |
| JP | 2003040900 | 2/2003 |
| JP | 2006075064 | 3/2006 |
| JP | 2007097465 | 4/2007 |
| KR | 20030068972 | 8/2003 |

OTHER PUBLICATIONS

JP-06062793-Machine Translation.*
Raksakulthai, R. et al., Exopeptidases and Their Application to Reduce Bitterness in Food: A Review, Critical Reviews in Food Science and Nutrition, 2003, vol. 43, No. 4, pp. 401-445.
Roy, G., The Applications and Future Implications of Bitterness Reduction and Inhibition in Food Products, Critical Reviews in Food Science and Nutrition, 1990, vol. 29, No. 2, pp. 59-71.
Nishiwaki, T. et al., Debittering of Enzymatic Hydrolysates Using an Aminopeptidase from the Edible Basidiomycete Grifola frondosa, Journal of Bioscience and Bioengineering, 2002, vol. 93, No. 1, pp. 60-63.
Liu, F. et al., Debittering Effect of Monascus Carboxypeptidase During the Hydrolysis of Soybean Protein, Journal of Industrial Microbiology & Biotechnology, 2005, vol. 32, No. 10, pp. 487-489.
Chien, R. et al., Purification, Characterization, and Genetic Analysis of a Leucine Aminopeptidase from *Aspergillus sojae*, Biochimica et Biophysica Acta, 2002, vol. 1576, No. 1-2, pp. 119-126.
Extended European Search Report dated Oct. 28, 2011, from the European Patent Office in corresponding European Application No. 09773555.9.
Suetsuna, K., Isolation and characterization of angiotensin I-converting enzyme inhibitor dipeptides derived from *Allium sativum* L (garlic), J. Nutr. Biochem, 9:415-419, 1998.
Wang, W., et al., A New Frontier in Soy Bioactive Peptides that May Prevent Age-related Chronic Diseases, Comprehensive Reviews in Food Science and Food Safety 4:63-78, 2005.
Doumas, A., et al., Characterization of the Prolyl Dipeptidyl Peptidase Gene (ddpIV) from the Koji Mold *Aspergillus oryzae*, Applied and Environmental Microbiology 64(12):4809-4815, Dec. 1998.
Nakadai, T., Shoyu Kojikin no Seisan suru Kakushu Koso no Yakuwari, Journal of Japan Soy Sauce Research Institute, 1985 Nen 3 Gatsu, vol. 11, No. 2, pp. 67-79.

* cited by examiner

*Primary Examiner* — D. Lawrence Tarazano
*Assistant Examiner* — Hamid R Badr
(74) *Attorney, Agent, or Firm* — Roylance, Abrams, Berdo & Goodman, L.L.P.

(57) ABSTRACT

A fermented seasoning which does not have the bitterness specific to peptides and can be easily ingested orally, in spite of containing large amount of peptides is provided. Namely, a fermented seasoning obtained by adding salt water to an *Aspergillus* culture or a mixture of the *Aspergillus* culture with a plant-derived protein material and by controlling the leucine aminopeptidase-I activity in the moromi to be 1.0 U/ml or less, and also controlling the leucine aminopeptidase-II activity in the moromi to be 0.5 U/ml or less, within 10 days after the preparation.

7 Claims, 3 Drawing Sheets

PEPTIDE-CONTAINING SEASONING

TECHNICAL FIELD

The present invention relates to a flavorous fermented seasoning which hardly has the bitterness of peptides although it richly contains peptides.

BACKGROUND OF THE INVENTION

In recent years, various functionalities possessed by peptides have been revealed. For example, it has been reported that Gly-Tyr and Ser-Tyr have an angiotensin converting enzyme inhibitory activity and a hypotensive activity (e.g., see Non-patent Reference 1). Additionally, anti-oxidation, anticancer, inhibition of blood pressure increase, lowering of blood cholesterol, opioid activity and the like have also been reported for various peptides (e.g., see Non-patent Reference 2). Accordingly, various physiological effects which contribute to human health can be expected by ingesting peptides.

As the production method of peptides, a method for chemical synthesis and a method for hydrolyzing a protein-containing material with a protease preparation are broadly used as conventionally known methods. However, the former case is unsuitable for oral ingestion because it uses chemicals and the latter case has a problem in that the production cost becomes high and oral ingestion cannot be made easily because of the strong bitterness of peptides.

As the means for solving the bitterness of peptides, several techniques have so far been devised. For example, there have been disclosed a method for adding cyclodextrins (e.g., see Patent Reference 1), a method for adding oligosaccharides (e.g., see Patent Reference 2), a method for adding organic acids and saccharides (e.g., see Patent Reference 3), a method for adding phospholipids (e.g., see Patent Reference 4), a method for contact treating with synthetic absorbing resins (e.g., see Patent Reference 5), and the like. However, it is the present situation that these cannot be said sufficient in terms of their effects, such as generation of a new foul taste due to masking agents, considerable increase in the production cost, and the like.

By the way, soy sauce is a seasoning which has been used from early times, and its rich deliciousness is created by the hydrolysis of soybean and wheat with the enzymes produced by *Aspergillus*. The deliciousness is produced by the solubilization of material proteins to be peptides through the activity of proteases and additional degradation of the peptides into amino acids including glutamic acid by the activity of peptidases. Accordingly, the technical development of soy sauce over many years has been carried out by putting the primary object in strengthening its deliciousness by degrading the proteins and peptides into amino acids to the utmost.

In the brewing of soy sauce, it is considered that peptides are remained in soy sauce when they are not degraded by peptidase after release of the peptides by protease. Accordingly, it is expected to have various profitable physiological activities as described in the above. However, since it is considerably difficult to specifically control the peptidase activity in the general preparing step, such a soy sauce or fermented seasoning has not so far been invented.

RELATED ART REFERENCES

Patent References

Patent Reference 1: JP-A-2006-75064
Patent Reference 2: JP-A-2007-97465
Patent Reference 3: JP-A-11-118160
Patent Reference 4: JP-A-8-173093
Patent Reference 5: JP-A-2003-40900

Non-Patent References

Non-patent Reference 1: K. Suetsuna, J. Nutr. Biochem., 1998, (9), p. 415-419
Non-patent Reference 2: Wenyi Wang et al., Comprehensive Reviews in Food Science and Food Safety, 2005, (4), p. 63-78

SUMMARY OF THE INVENTION

Problems to be Solved by the Invention

The problems to be solved by the present invention are to provide a fermented seasoning which does not have bitterness which is specific to peptides and is easy to ingest orally, although it richly contains peptides having useful physiological activities.

Means for Solving the Problems

With the aim of solving the above-mentioned problems, the inventors of the present invention have carried out intensive studies and found as a result that a fermented seasoning obtained by adding salt water to an *Aspergillus* culture or a mixture of the an *Aspergillus* culture with a plant-derived protein material to make a moromi and by controlling the leucine aminopeptidase-I (to be referred sometimes to as LAP-I hereinafter) activity in the moromi to be 1.0 U/ml or less, and also controlling the leucine aminopeptidase-II (to be referred sometimes to as LAP-II hereinafter) activity in the moromi to be 0.5 U/ml or less, within 10 days after the preparation, surprisingly contains far much peptides than the case of the usual soy sauce in spite of the sufficient nitrogen utilizing ratio; does not show the bitterness specific to peptides; and has a mellow and rich deliciousness. Thus, the present invention is accomplished.

Namely, the present invention provides
1) a fermented seasoning obtained by adding salt water to an *Aspergillus* culture or a mixture of the *Aspergillus* culture with a plant-derived protein material and by controlling the leucine aminopeptidase-I activity in the moromi to be 1.0 U/ml or less, and also controlling the leucine aminopeptidase-II activity in the moromi to be 0.5 U/ml or less, within 10 days after the preparation,
2) the fermented seasoning described in the above-mentioned 1), which contains 1.2% or more of soluble total nitrogen and 40 mg/ml or more of soluble peptides,
3) the fermented seasoning described in the above-mentioned 1) or 2), wherein the soluble total nitrogen is 1.2% or more and the amination ratio based on the soluble total nitrogen is 55% or less,
4) the fermented seasoning described in any one of the above-mentioned 1) to 3), wherein the soluble total nitrogen is 1.2% or more and concentration of free amino groups per 1% soluble total nitrogen is 0.35 mol/l or less,
5) the fermented seasoning described in any one of the above-mentioned 1) to 4), which contains 40 µg/ml or more of a dipeptide Gly-Tyr,
6) the fermented seasoning described in any one of the above-mentioned 1) to 5), which contains 20 µg/ml or more of a dipeptide Ser-Tyr, and 7) the fermented seasoning described in any one of the above-mentioned 1) to 6), which is soy sauce.

Effect of the Invention

According to the present invention, a fermented seasoning which does not have the bitterness specific to peptides and can be easily ingested orally, though it richly contains peptides having useful physiological activities was provided.

MODE FOR CARRYING OUT THE INVENTION

Figure 1:
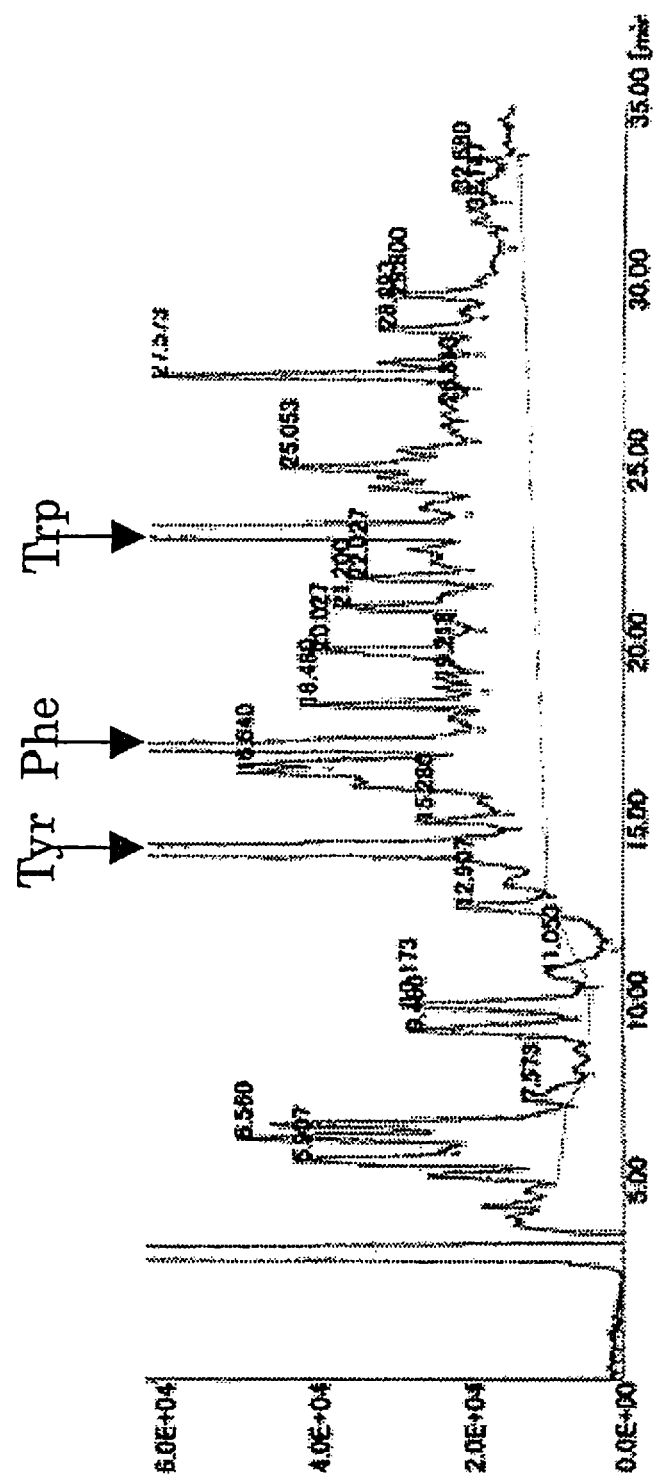
FIG. 1 is a figure showing an HPLC chromatogram of the composition 1.

The following describes the present invention in detail.

The fermented seasoning of the present invention is obtained by adding salt water to an *Aspergillus* culture or a mixture of the *Aspergillus* culture with a plant-derived protein material and by controlling the leucine aminopeptidase-I activity in the moromi at 1.0 U/ml or less, and also by controlling the leucine aminopeptidase-II activity in the moromi at 0.5 U/ml or less, within 10 days after the preparation.

As the *Aspergillus* culture, a soy sauce koji broadly and generally used the soy sauce brewing can be used, and specifically, it can be obtained by inoculating an *Aspergillus* conidia on a solid medium containing soybean, wheat and the like and culturing it at from 25° C. to 45° C. for from 12 hours to 240 hours. Additionally, a liquid-cultured koji which is used in the production of fermented seasonings can also be used, and specifically, it can be obtained by inoculating *Aspergillus* conidia into a liquid medium containing soybean, wheat, wheat bran and the like and culturing it at from 25° C. to 45° C. for from 24 hours to 120 hours.

As the plant-derived protein material of the present invention, although any material may be used as long as it can achieve the object of the present invention, in order to provide a taste suitable as a seasoning, it is preferable to use soybean, defatted soybean, purified soybean protein, wheat, wheat gluten, rice or purified rice protein. These materials can be used as such or after their crushing, pulverization and subsequent optional protein denaturation treatment. As the protein denaturation treatment, industrially broadly used pressure cooking and puffing treatment are preferable.

As the fermentation conditions, from 30% to 500%, preferably from 100% to 300%, by weight ratio of a salt water is added to the *Aspergillus* culture and the plant-derived protein material mixed at a ratio of from 5:95 to 100:0, preferably from 10:90 to 80:20. It is preferable to adjust a salt concentration of the moromi from 0.1 to 20%, preferably from 6 to 18%. Furthermore, the mixture is put into a temperature-controllable container and fermentation is carried out at from 25° C. to 60° C., preferably from 30° C. to 55° C., for from 6 hours to 720 hours, from 12 hours to 240 hours. During this period, the moromi may be optionally mixed using a mixing blade, a compressed air and the like. Although the leucine aminopeptidase (to be referred sometimes to as LAP hereinafter) activity in the moromi changes due to influences of the initial LAP activity of the *Aspergillus* culture, mixing ratio of the *Aspergillus* and plant-derived protein material, their fermentation temperature and fermentation time, and the like, the object fermented seasoning can be obtained by controlling the LAP-I activity in the moromi to be 1.0 U/ml or less, and controlling the LAP-II activity in the moromi to be 0.5 U/ml or less, within 10 days after the preparation.

Although the aforementioned fermented seasoning is a soy sauce moromi-like form, a liquid form fermented seasoning containing soluble peptides can also be obtained by removing solid contents in response to the necessity. As the method for removing insoluble matter, conventionally known methods such as a method in which the moromi is wrapped with a filter cloth made of synthetic fibers such as nylon and the like and pressed, a method in which the moromi is put into filter cloths applied to a filter plate and a compression plate and pressed using compressed air and the like, and the like can be used.

It is possible to further improve the flavor by adding a yeast strain belonging to the genus *Zygosaccharomyces* to the aforementioned fermented seasoning and carrying out fermentation. Specifically, from $10^4$ cells/ml to $10^8$ cells/ml, preferably from $10^5$ cells/ml to $10^7$ cells/ml, of the yeast are added to the moromi and the fermentation is carried out at from 20° C. to 35° C., preferably from 25° C. to 30° C. for 3 days or more, preferably from 5 to 10 days. In order to activate the fermentation, agitation and aeration are optionally carried out. In this connection, the amount of peptides is hardly reduced when the fermentation is carried out under such conditions.

Although it contains a large amount of peptides, the aforementioned fermented seasoning hardly shows bitterness; has mellow and rich deliciousness and body and mild and excellent aroma; and can be ingested deliciously as a seasoning, which is much differing from the conventionally known peptide-containing compositions.

Since the aforementioned fermented seasoning has a desirable taste, it can be suitably used by making it into a soy sauce or soy sauce containing product through its addition to soy sauce or processing it into tsuyu (Japanese soup), tare (dipping sauce), ponzu (citrus-based sauce), sauce, dressing, soup, household dish base, drink, supplement and the like by mixing it with various materials.

Additionally, the peptides can also be concentrated or separated and purified from the aforementioned fermented seasoning. Examples of a method include vacuum concentration, ultrafiltration, dialysis, various types of chromatography and the like. These are generally and broadly used methods.

Although the following specifically describes the present invention based on examples, the technical scope of the present invention is not limited by these descriptions.

Example 1

Production of Fermented Seasoning Containing Peptides

A soy sauce koji was obtained by adding conidia of *Aspergillus*: *Aspergillus sojae* to a solid medium containing the same amount of puffed soybean and wheat and carrying out fermentation at from 25° C. to 40° C. for 72 hours. Next, 14 kg of puffed soybean, 2 kg of the soy sauce koji, 16 liters of water and 3 kg of common salt were mixed and agitated at 45° C. and at 100 rpm. Ten days thereafter, a moromi in which the LAP-I activity in the moromi was decreased to be 1.0 U/ml or less, and the LAP-II activity in the moromi was decreased to be 0.5 U/ml or less, was obtained. Next, a yeast *Zygosaccharomyces rouxii* was mixed therewith at a ratio of $1.5 \times 10^6$ cells/ml and allowed to stand still at 25° C. for 7 days. Next, a supernatant was obtained by removing insoluble solid contents from the moromi using a hydraulic press. Furthermore, enzyme deactivation and sterilization were carried out by at 117° C. for 5 seconds using an HS sterilizer (mfd. by HISAKA WORKS, LTD.), and after 3 days of standing at 50° C., 20 liters of the supernatant alone which does not contain sediments was collected (Composition 1; a fermented seasoning of the present invention). Also, a fermented seasoning was prepared by the same method using 3.2 kg of soybean and 12.8 kg of the soy sauce koji (Composition 2; a fermented seasoning of the present invention). Furthermore, a fermented seasoning was prepared by the same method using 16 kg of the soy sauce koji but not adding soybean in fermentation (Composition 3; a fermented seasoning of the present invention).

By filtering each moromi of on the 10th day after the preparation, various peptidase activities of the thus obtained broths were measured. The LAP-I activity was measured by the method described in Japanese Patent No. 3727780 using L-leucine-p-nitroanilide as the substrate. The LAP-II activity was measured by the method described in Japanese Patent No. 3727780 after removing free amino acids by subjecting the moromi to a PD-10 column (mfd. by GE Health Care Bioscience), with using L-leucyl-glycyl-glycine as the substrate. The acidic carboxypeptidase (ACP) activity was measured after removing free amino acids by subjecting the moromi to the PD-10 column, in accordance with the usual way using an acidic carboxypeptidase activity measuring kit (mfd. by KIKKOMAN CORPORATION). The dipeptidyl peptidase IV (DPP-IV) activity was measured by the method described by Agnes Doumas et al., Applied and Environmental Microbiology, 1998, vol. 64, No. 12, p. 4809-4815 (Table 1). Although the activities of ACP and DPP-IV did not change when prepared at 45° C. for 10 days in comparison with the case of 15° C., the activity of LAP was lowered at 45° C. (Composition 3; a fermented seasoning of the present invention). When the ratio of koji was reduced, respective enzyme activities in the moromi were further lowered (Compositions 1 and 2; fermented seasonings of the present invention). In the case of Composition 1, it can be seen that particularly the LAP activity is considerably lowered in comparison with the Koikuchi soy sauce moromi of comparative example (initial stage fermentation temperature 15° C., koji:soybean=10:0). On the other hand, when a fermented seasoning similar to the composition 3 was prepared using a koji having different production batch, a case in which the LAP activity was high in comparison with the present invention was also found (Comparative Example 1).

TABLE 1

| | Fermentation temp. | Koji:soybean | LAP-I | LAP-II | ACP | DPP-IV |
|---|---|---|---|---|---|---|
| Composition 1 | 45° C. | 1:7 | 0.06 | 0.01 | 0.32 | 0.021 |
| Composition 2 | 45° C. | 8:2 | 0.33 | 0.18 | 1.69 | 0.102 |
| Composition 3 | 45° C. | 10:0 | 0.78 | 0.30 | 1.90 | 0.111 |
| Comparative Example 1 | 45° C. | 10:0 | 1.15 | 0.59 | 1.99 | 0.109 |
| Koikuchi soy sauce | 15° C. | 10:0 | 2.39 | 1.65 | 1.69 | 0.098 |

Example 2

Next, various analyses of other than the enzyme activities were carried out. Soluble total nitrogen (TN) was measured in accordance with the usual method using Kjeltec Auto Sampler System 1035 (mfd. by ACTAC). The amount of peptides was calculated from the amount of free amino acids increased in comparison with that of before the hydrochloric acid hydrolysis, by heating at 110° C. for 24 hours in the presence of 6 N hydrochloric acid and then carrying out total amino acid analysis with using an amino acid analyzer L-8500 (mfd. by Hitachi, Ltd.). The amination ratio means a ratio of total amino acid concentration based on the TN. In this connection, 6.25 as the general nitrogen factor of soybean protein was used in the calculation of TN. The free amino group concentration was calculated from a calibration curve prepared with using glycine having known concentration, after allowing it to react with the equivalent amount of an OPA reagent (mfd. by Agilent Technologies, Inc.) and measuring fluorescence intensity at Ex: 350 nm and Em: 450 nm. The amounts of Gly-Tyr and Ser-Tyr were calculated by standard addition curves of standard spiked samples using LC-MS/MS System 2695-QuattroMicro API (mfd. by Waters Corporation). In the case of the compositions 1, 2 and 3 in which the LAP activity was lowered (fermented seasonings of the present invention), it can be seen that the amount of peptides is large in comparison with that of the Koikuchi soy sauce; the amination ratio is low; and the free amino group concentration per 1% TN is low (Table 2). On the other hand, in the case of Comparative Example 1 which was prepared in the same manner as in composition 3 using a koji having a different production batch, it can be seen that the amount of peptides is small; the amination ratio is high; and the free amino group concentration per 1% TN is high. Based on these, in order to obtain the fermented seasoning of the present invention comprising large amount of peptides, it is an essential condition to control the LAP-I activity to be 1.0 U/ml or less, and controlling the LAP-II activity to be 0.5 U/ml or less, and it can be said that the fact has not been known conventionally.

TABLE 2

| | Initial stage fermentation temperature | Koji:soybean | Fermentation period | TN (%) | Amount of peptides (mg/ml) | Amination ratio (%) | Free amino group concentration per 1% TN (mol/L) | Gly-Tyr (µg/ml) | Ser-Tyr (µg/ml) |
|---|---|---|---|---|---|---|---|---|---|
| Composition 1 | 45° C. | 1:7 | 17 days | 1.494 | 79.2 | 44.9 | 0.24 | 171 | 124 |
| Composition 2 | 45° C. | 8:2 | 17 days | 1.316 | 58.0 | 48.6 | 0.30 | 77 | 31 |
| Composition 3 | 45° C. | 10:0 | 17 days | 1.325 | 49.4 | 50.3 | 0.32 | 90 | 20 |
| Comparative Example 1 | 45° C. | 10:0 | 17 days | 1.443 | 37.2 | 56.4 | 0.37 | 35 | 13 |
| Koikuchi soy sauce (KIKKOMAN special selection whole soybean) | 15° C. | 10:0 | 180 days | 1.680 | 29.0 | 63.9 | 0.46 | 22 | 4 |

TABLE 2-continued

| | Initial stage fermentation temperature | Koji:soybean | Fermentation period | TN (%) | Amount of peptides (mg/ml) | Amination ratio (%) | Free amino group concentration per 1% TN (mol/L) | Gly-Tyr (μg/ml) | Ser-Tyr (μg/ml) |
|---|---|---|---|---|---|---|---|---|---|
| Koikuchi soy sauce (Company A) | — | — | — | 1.596 | 31.3 | 61.2 | 0.41 | 14 | 4 |
| Koikuchi soy sauce (Company B) | — | — | — | 1.598 | 32.1 | 59.8 | 0.42 | 22 | 6 |

Figure 2:
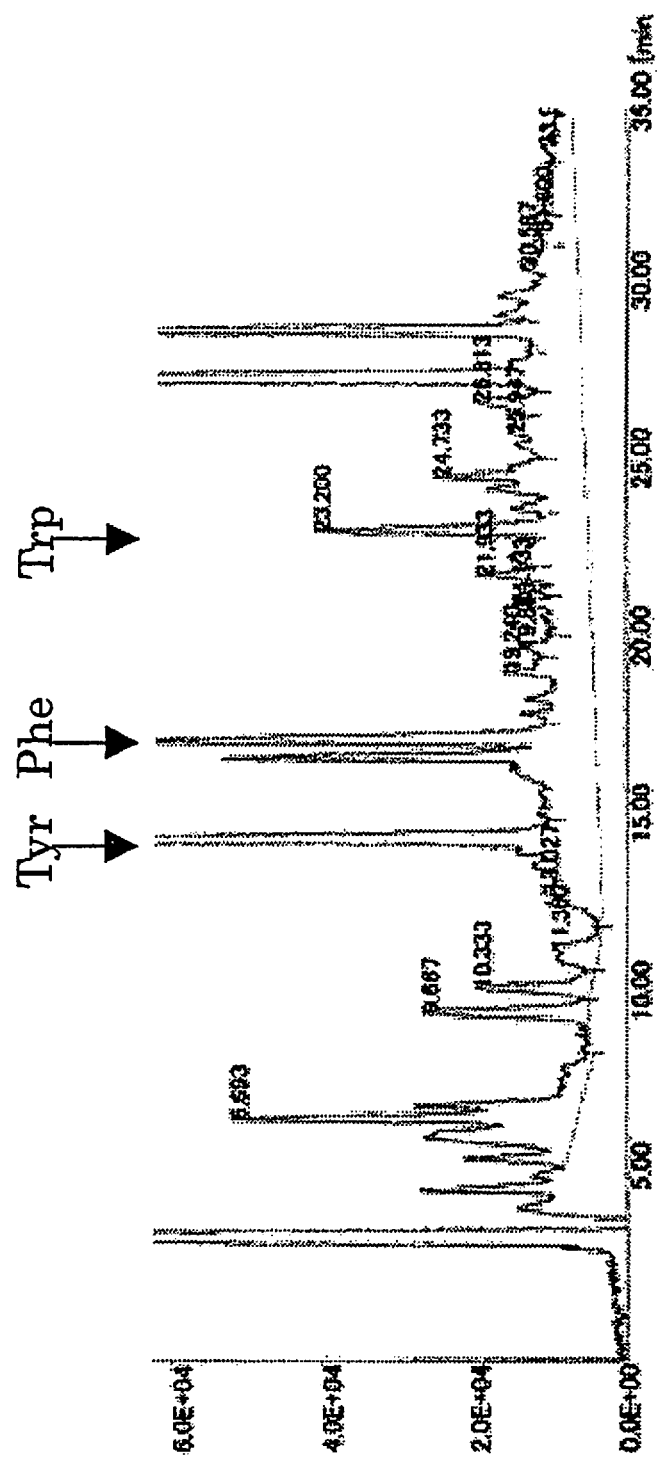
FIG. 2 is a figure showing an HPLC chromatogram of dark color (koikuchi) soy sauce.

The composition 1 (a fermented seasoning of the present invention) and a general Koikuchi soy sauce were analyzed using a high performance liquid chromatography (to be referred to as HPLC hereinafter, mfd. by JASCO Corporation) equipped with Puresil C18 column (4.6×250 mm, mfd. by Waters Corporation). Elution was carried out using an eluent containing 0.1% trifluoroacetic acid (TFA) at a flow rate of 1 ml/min. and at a gradient of from 0% to 30% in acetonitrile concentration. Detection was carried out by an absorbance of 220 nm. In this connection, it is generally known that most of the peaks observed under the analytical condition are derived from peptides. From FIG. 1 and FIG. 2, it can be seen that in comparison with the general Koihuchi soy sauce, a great variety of peptides are found in the composition 1 (a fermented seasoning of the present invention) and their amounts are also considerably large. In this connection, it was confirmed that the large peaks at 15 minutes, 18 minutes and 23 minutes (shown by ↓) which are also found in the Koikuchi soy sauce are not peptides but respectively amino acids Tyr, Phe and Trp. Additionally, it was confirmed also that the other amino acids are hardly retained by this column and eluted after 5 minutes or less.

A fermented seasoning was prepared by the same method using a protease preparation for food use, Alkalase 2.4 L-FG (mfd. by Novozymes), instead of soy sauce koji (Comparative Example 2). A sensory evaluation was carried out using the composition 1 (a fermented seasoning of the present invention) and Comparative Example 2. The "strength of bitterness" and "preference of taste" were evaluated by 8 panelists by a pair comparison method. From the results of Table 3, it can be seen that the fermented seasoning of the present invention shows little bitterness and has desirable taste in spite of containing a large amount of peptides. Although a large number of methods for producing peptides by protease preparations have so far been disclosed, it is considered that the present invention is superior to the related arts in terms of the taste.

TABLE 3

| | Samples having strong bitterness | Samples having desirable taste |
|---|---|---|
| Composition 1 | 1 | 8 |
| Comparative Example 2 | 7 | 0 |

Example 3

Efficacy Test on People Having High Blood Pressure

Figure 3:
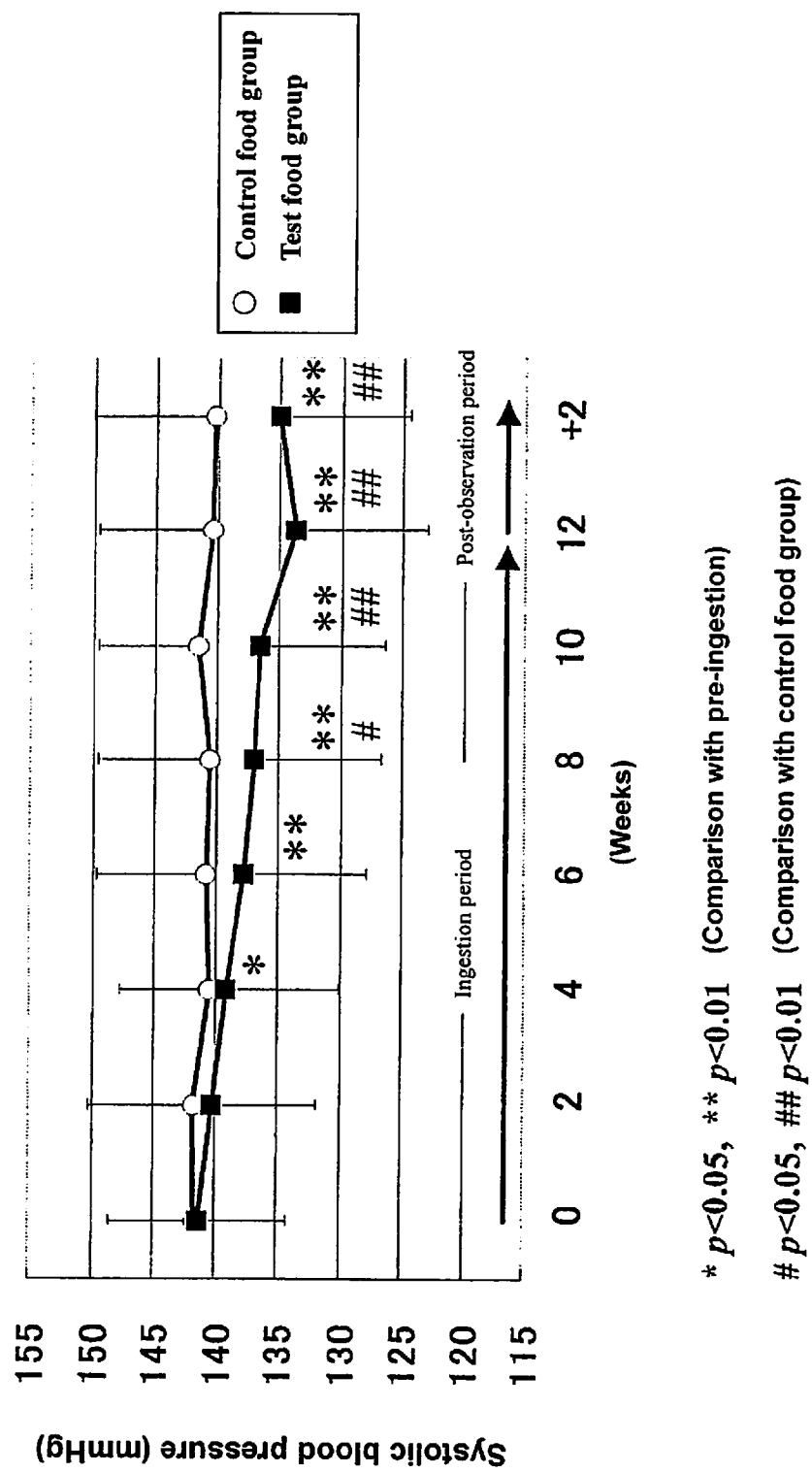
FIG. 3 is a figure showing changes in the systolic blood pressure when people having high blood pressure ingested the fermented seasoning of the present invention.

A soy sauce-like seasoning containing 54 μg/ml of Gly-Tyr and 31 μg/ml of Ser-Tyr was prepared using the fermented seasoning of the present invention, and its continuous ingestion test was carried out for 12 weeks on high-normal blood pressure peoples (36 males and 35 females, a total of 71 peoples) and mild hypertension peoples (degree I hypertension peoples) (29 males and 32 females, a total of 61 peoples)), by a double blind test using a general low salt soy sauce as the control food. The subjects were allowed to ingest the food to be tested or control food, one bag (8 ml) once a day for continuously for 12 weeks, by using it for cooking at an optional time (per 8 ml which is a standard daily ingestion of soy sauce at home, contains 430 μg of Gly-Tyr and 250 μg of Ser-Tyr). As a result, a periodical mild hypotensive effect was observed by ingesting the food to be tested of the present invention (FIG. 3). In comparison with the value of before ingestion, the systolic blood pressure showed a significant lowering in and after 4 weeks of ingestion. Additionally, in comparison with the control food group, the systolic blood pressure was significantly lowered in and after 8 weeks of ingestion. From these results, it was confirmed that the fermented seasoning of the present invention has a significant hypotensive activity by peptides in comparison with the low salt soy sauce, and it was revealed that the effect is remarkable when 40 μg/ml or more of Gly-Tyr and 20 μg/ml or more of Ser-Tyr were contained.

While the present invention has been described in detail and with reference to specific embodiments thereof, it will be apparent to one skilled in the art that various changes and modifications can be made therein without departing from the spirit and scope of the present invention.

This application is based on a Japanese patent application filed on Jul. 2, 2008 (Japanese Patent Application No. 2008-172871) and a Japanese patent application filed on Jun. 29, 2009 (Japanese Patent Application No. 2009-153239), and the entire contents thereof is thereby incorporated by reference.

INDUSTRIAL APPLICABILITY

The fermented seasoning obtained by the present invention does not have the bitterness specific to peptides and can be easily ingested orally, although it richly contains peptides. Therefore, it is expected to exert useful physiological activities and to contribute to the human health.

The invention claimed is:

1. A fermented seasoning obtained by adding salt water to a mixture of an *Aspergillus* koji and a plant-derived protein material selected from the group consisting of soybean, defatted soybean, purified soybean protein, wheat, wheat gluten, rice and purified rice protein to prepare a moromi, fermenting the moromi at a temperature of between 25° C. and 60° C. for 6 hours to 720 hours, controlling leucine aminopeptidase-I activity in the moromi to be 1.0 U/ml or less, and also controlling leucine aminopeptidase-II activity to be 0.5 U/ml or less, within 10 days after the preparation, and wherein the fermented seasoning contains 40 mg/ml or more of soluble peptides.

2. The fermented seasoning according to claim 1, which contains 1.2% or more of soluble total nitrogen.

3. The fermented seasoning according to claim 1, wherein the soluble total nitrogen is 1.2% or more and the amination ratio based on the soluble total nitrogen is 55% or less.

4. The fermented seasoning according to claim 1, wherein the soluble total nitrogen is 1.2% or more and concentration of free amino groups per 1% soluble total nitrogen is 0.35 mol/l or less.

5. The fermented seasoning according to claim 1, which contains 40 μg/ml or more of a dipeptide Gly-Tyr.

6. The fermented seasoning according to claim 1, which contains 20 μg/ml or more of a dipeptide Ser-Tyr.

7. The fermented seasoning according to claim 1, which is soy sauce.

* * * * *

UNITED STATES PATENT AND TRADEMARK OFFICE
CERTIFICATE OF CORRECTION

PATENT NO.        : 8,691,302 B2
APPLICATION NO.   : 13/001931
DATED             : April 8, 2014
INVENTOR(S)       : Nakahara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this

Twenty-ninth Day of September, 2015

Michelle K. Lee
*Director of the United States Patent and Trademark Office*